United States Patent [19]

Olson

[11] Patent Number: 4,651,210
[45] Date of Patent: Mar. 17, 1987

[54] ADJUSTABLE GAMMA CONTROLLER

[75] Inventor: Charles L. Olson, Camden County, N.J.

[73] Assignee: RCA Corporation, Princeton, N.J.

[21] Appl. No.: 685,721

[22] Filed: Dec. 24, 1984

[51] Int. Cl.$^4$ ............................................. H04N 5/202
[52] U.S. Cl. ..................................... 358/164; 358/32;
    358/169; 307/491; 307/494; 307/497; 307/501;
    328/142; 330/253; 330/254; 330/260
[58] Field of Search ......................... 358/32, 164, 169;
    307/490, 491, 493, 494, 497, 501; 328/142, 162;
    330/252, 253, 254, 259, 260, 261

[56]  References Cited
U.S. PATENT DOCUMENTS

| | | | |
|---|---|---|---|
| 3,633,044 | 1/1972 | Buckstad et al. | 307/230 |
| 4,249,208 | 2/1981 | Haenen et al. | 358/164 |
| 4,410,908 | 10/1983 | Belmares-Sarabia et al. | 358/30 |
| 4,464,633 | 9/1984 | Harwood et al. | 330/254 |

FOREIGN PATENT DOCUMENTS

| | | | |
|---|---|---|---|
| 59-10076 | 1/1984 | Japan | 358/164 |
| 694485 | 7/1953 | United Kingdom | 358/164 |
| 935688 | 11/1958 | United Kingdom | 358/164 |

Primary Examiner—James J. Groody
Assistant Examiner—Michael D. Parker
Attorney, Agent, or Firm—Eugene M. Whitacre; Lawrence C. Edelman; Peter M. Emanuel

[57]  ABSTRACT

A gamma corrector for a video signal includes a first amplifier, a nonlinear signal translating stage and a second amplifier coupled in cascade in the order named. A feedback network coupled between the output of the second amplifier and a gain-control input of the first amplifier derives a gain-control signal indicative of the white level of the video signal produced at the output of the second amplifier. A gamma control signal is applied to a gain control input of the second amplifier in one embodiment and to a black level clamp associated with the first amplifier stage in another embodiment.

13 Claims, 2 Drawing Figures

4,651,210

ADJUSTABLE GAMMA CONTROLLER

BACKGROUND OF THE INVENTION

The present invention relates to an adjustable video signal gamma controller for a television system.

In a television system it is necessary to process the video signals (e.g., before transmission) to compensate for certain nonlinearities in the respective transmission and receiving systems to ensure that viewers see a picture which is a true reproduction of the televised scene. Among the nonlinearities of the system for which compensation must be made are the gamma characteristics of the pickup tube of the television camera and the picture tubes of television receivers.

Although a television camera including solid state imagers, such as a charge-coupled device (CCD), has a substantially linear optical-to-electrical conversion characteristic, gamma control is still desirable to correct for signal processing nonlinearities in the video processor of the camera as well as nonlinearities of the picture tubes of television receivers. For example, if a video signal varying linearly in amplitude is applied to a conventional picture tube in a television receiver, it is likely to result in a picture having a contrast range which is undesirably distorted in accordance with the nonlinear electrical-to-optical conversion characteristic (gamma) of the picture tube. A measure of the nonlinearity is the exponent of the power law function which describes the nonlinear transfer characteristic. Accordingly, it is desirable to adjust the gamma of the video signal prior to transmission in such a manner that the signal received and reproduced in a television receiver has an undistorted contrast range.

Generally, gamma correction is accomplished by passing the video signals derived from the television camera through a nonlinear circuit having a predetermined power law relationship (i.e., $y=x^\gamma$) between its input and output to compensate for the substrate nonlinear transfer characteristic of the picture tube in the television receiver. It is generally accepted that the power law relationship provided by the nonlinear circuit should have an exponent (or power) which is the reciprocal of the picture tube gamma (e.g., +2.2). Typically the exponent is 0.45. The gamma correction circuit is usually located in a video signal processing amplifier coupled between the camera pickup tube and the color encoder.

Sometimes it is desirable that the amount of gamma correction be adjustable. For example, when several television cameras are used for televising a scene, such as a sporting event or during a studio production, it is important that the contrast range of the video signal supplied from each of the various cameras be matched in order to prevent noticeable variations in the midtone brightness of the reproduced image when switching among the various cameras. Preferably, the amount of gamma correction provided by each camera can be remotely controllable in order that a person at a remote location, such as in a control room, can conveniently monitor the video signal from each camera and adjust the value of their gamma correction.

Furthermore, it is also desirable to intentionally distort the contrast range of a reproduced image in, e.g. closed circuit surveillance and video microscope systems, to improve the visability of a portion of the reproduced image. An adjustable gamma controller can conveniently provide such intentional distortion of the contrast range.

In general, adjustment of the nonlinear circuits which determine the amount of gamma correction will change either one or both of the black level and the white level of the video signal. Variations of these levels in a multi-camera television production system is undesirable since it results in noticeable brightness variations in the reproduced image. In the past, relatively complex circuit arrangements were used in conjunction with adjustable gamma controllers for maintaining relatively constrast black and white video signal levels without disturbing the desired nonlinearity set by the gamma controller.

Therefore, it is desirable to provide a relatively simple and therefore more cost effective and inherently more reliable adjustable gamma controller. Furthermore, it is desirable that adjustment of the gamma controller does not adversely effect the white and black levels of the video signal.

SUMMARY OF THE INVENTION

In accordance with the principles of the invention a gamma controller for adjusting the gamma of a video signal in response to a gamma control signal comprises a first signal translating means having a signal input responsive to the video signal and a signal output for supplying the video signal with a signal level which is controlled in response to the gamma control signal.

A second signal translation means having a signal input coupled to the signal output of the first signal translating means and having a nonlinear signal input/output translating characteristic is responsive to the controlled level video signal for providing at a signal output the video signal having a predetermined amount of gamma adjustment, the amount being determined by the level of the controlled level video signal.

An amplitude control means having an input coupled to the output of the second signal translating means senses the gamma adjusted video signal and establishes a given amplitude for the white level thereof.

DETAILED DESCRIPTION OF THE DRAWING

Figure 1:
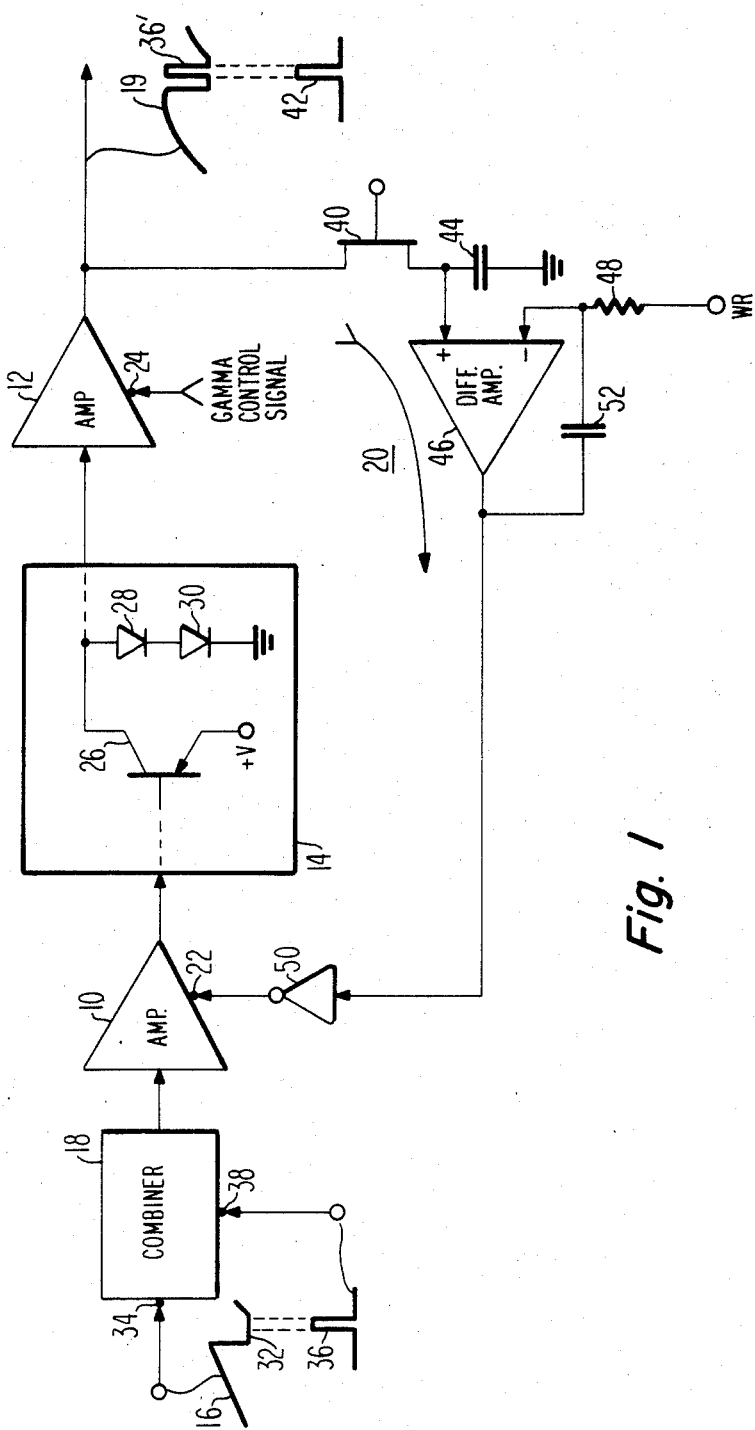
FIG. 1 illustrates, partially in block and partially in schematic diagram form, an adjustable gamma controller constructed in accordance with the present invention.

The gamma controller of FIG. 1 comprises first and second serially coupled gain-controlled amplifiers 10 and 12, respectively, and a non-linear signal translating stage 14 coupled between the output of amplifier 10 and the input of amplifier 12. A video signal 16 is supplied from, e.g., an image pickup tube of a television camera and associated signal processing circuitry (not shown) to the input of amplifier 10 via a signal combining circuit 18 and a gamma corrected video signal 19 is supplied at the output of amplifier 12. A feedback loop 20 is coupled from the output of amplifier 12 to a gain-control input 22 of amplifier 10 for maintaining the gain for the combination of amplifiers 10 and 12 and nonlinear stage 14 substantially constant. A gamma control signal in the form of a variable level DC signal is applied to a gain-control input 24 of amplifier 12. A variable DC level gamma control signal is particularly well suited for use in cameras which must have their gamma correction controlled by remote control since variable level DC signals are relatively simple to generate (e.g., with the use of a potentiometer) and to transmit without undesirable radiation. If the level of the gamma control signal is decreased, thereby decreasing the gain of amplifier 12, the operation of feedback loop 20 will increase the gain of amplifier 10, thereby increasing the video signal level presented to nonlinear signal translating stage 14. Conversely, if the level of the gamma control signal is increased, the operation of feedback loop 20 will decrease the gain of amplifier 10, thereby decreasing the level of the video signal presented to nonlinear signal translating stage 14. In response to the increased or decreased level of the presented video signal, nonlinear signal translating stage 14 provides more or less, respectively, nonlinearity, i.e., gamma correction, to video signal 16. Feedback loop 20 includes provisions for sampling the video signal when it is at a predetermined level, as will be described below, for preventing shifts in the white level of gamma corrected video signal 19. Black level clamping circuitry (not shown in FIG. 1 but of the type to be described with respect to FIG. 2) is used for preventing shifts in the black level of gamma corrected video signal 19.

Illustratively, non-linear signal translating stage 14 includes a transistor 26 having its base electrode coupled to the output of amplifier 10 and is biased by resistors (not shown) for operation in a region in which there is a relatively linear relationship between variations of its collector current in response to variations of its base electrode current. Similarly-poled series-coupled diodes 28 and 30 are coupled between the collector electrode of transistor 26 and a source of reference potential, i.e., ground. As well known, there is a nonlinear (i.e., power law) relationship between the current passed through a diode and the voltage developed across its p-n junction. When the gain of amplifier 10 is increased or decreased, the level of the video signal applied to transistor 26 is correspondingly increased or decreased. This increases or decreases the collector electrode current of transistor 26 and therefore the current through diodes 28 and 30. This action drives diodes 28 and 30 further into or out of their nonlinear ranges and consequently provides an increased or decreased amount of gamma correction to the video signal. In the illustrated embodiment, two series-coupled diodes are used for developing the nonlinearity since the +1.4 volts provided across their serially connected p-n junctions is well matched to the +1.4 volt range of video signal 16. Although a particular arrangement is shown for nonlinear stage 14, alternative nonlinear signal translation stages could be used, such as one including a parallel connection of diodes, each diode having a series-connected resistor for establishing a different conduction threshold.

Thus, by shifting the level of the video signal applied to diodes 28 and 30 of nonlinear signal translating stage 14, the amount of gamma correction to the video signal is adjusted. The remaining portion of the arrangement shown in FIG. 1 is for maintaining the black and white levels of the video signal substantially invariant with changes in gamma control so that the image represented by the video signal may be reproduced with correct color and brightness by the reproducing device (e.g, a picture tube).

The video signal applied to nonlinear signal translating stage 14 from the output of amplifier 10 is formed in the following way. Video signal 16, illustrated as having recurrent scanning line portions with linearly increasing shape from a black level (e.g., 0.0 volts) to a white level (e.g., +1.4 volts) interspersed with constant, e.g., black level blanking portions 32, is applied to an input terminal 34 of combining circuit 18. Blanking portion 32 correspond to the time periods between successive scanning line intervals (i.e., horizontal blanking intervals). Alternatively, portions 32 could correspond to the field retrace intervals. So-called "white pulses" 36, having a peak amplitude level corresponding to the white level of video signal 16, e.g., +1.4 volts are applied to an input 38 of combiner 18 to be combined with video signal 16. White pulses 36 are timed to occur during blanking portions 32 so that they do not disturb the amplitudes of its image representative scanning line portions.

The video signal produced by combiner 18 is amplified and processed by amplifiers 10 and 12 and nonlinear signal translating stage 14 to produce gamma corrected video signal 19 including similarly processed white pulses 36' at the output of amplifier 12.

Feedback loop 20 includes a switching field-effect transistor (FET) 40 having its source electrode coupled to the output of amplifier 12 and its gate electrode coupled to a source of sampling pulses 42 so that it is selectively rendered conductive so as to sample gamma corrected video signal 19 at the output of amplifier 12 during a time period coincident with the occurrence of white pulses 36'. A capacitor 44 is coupled between the drain electrode of FET 40 and signal ground for storing the peak levels of white pulses 36'. Capacitor 44 is coupled to the noninverting (+) input of a gain stabilized differential input amplifying stage 46. The noninverting input of differential amplifying stage 46 has a relatively high impedance so that the peak level stored on capacitor 44 can be held between sampling pulses 42. A white level reference voltage WR (i.e., 1.4 volts) is applied to the inverting (−) input of amplifying stage 46 via a resistor 48 and its output is coupled to gain control input 22 of amplifier 10 via a signal inverter 50. Inverter 50 provides the signal inversion necessary for proper operation of feedback path 50. A capacitor 52 coupled between the output and inverting signal input of amplifying stage 46, in conjunction with resistor 48, reduces the high frequency gain of feedback path 20 by an amount sufficient to prevent self-oscillation. Amplifying stage 46 operates to provide a gain-control voltage to input 22 of amplifier 10 of a magnitude which maintains the level of white pulses 36', and therefore the white level of gamma corrected video signal 19, at the WR reference level substantially independent of the amount of gamma correction provided by nonlinear signal translating stage 14. If so desired, white pulses 36' can be removed from the video signal by a blanking circuit (not shown) included in the video signal processing circuitry which follows the above-described gamma corrector.

Figure 2:
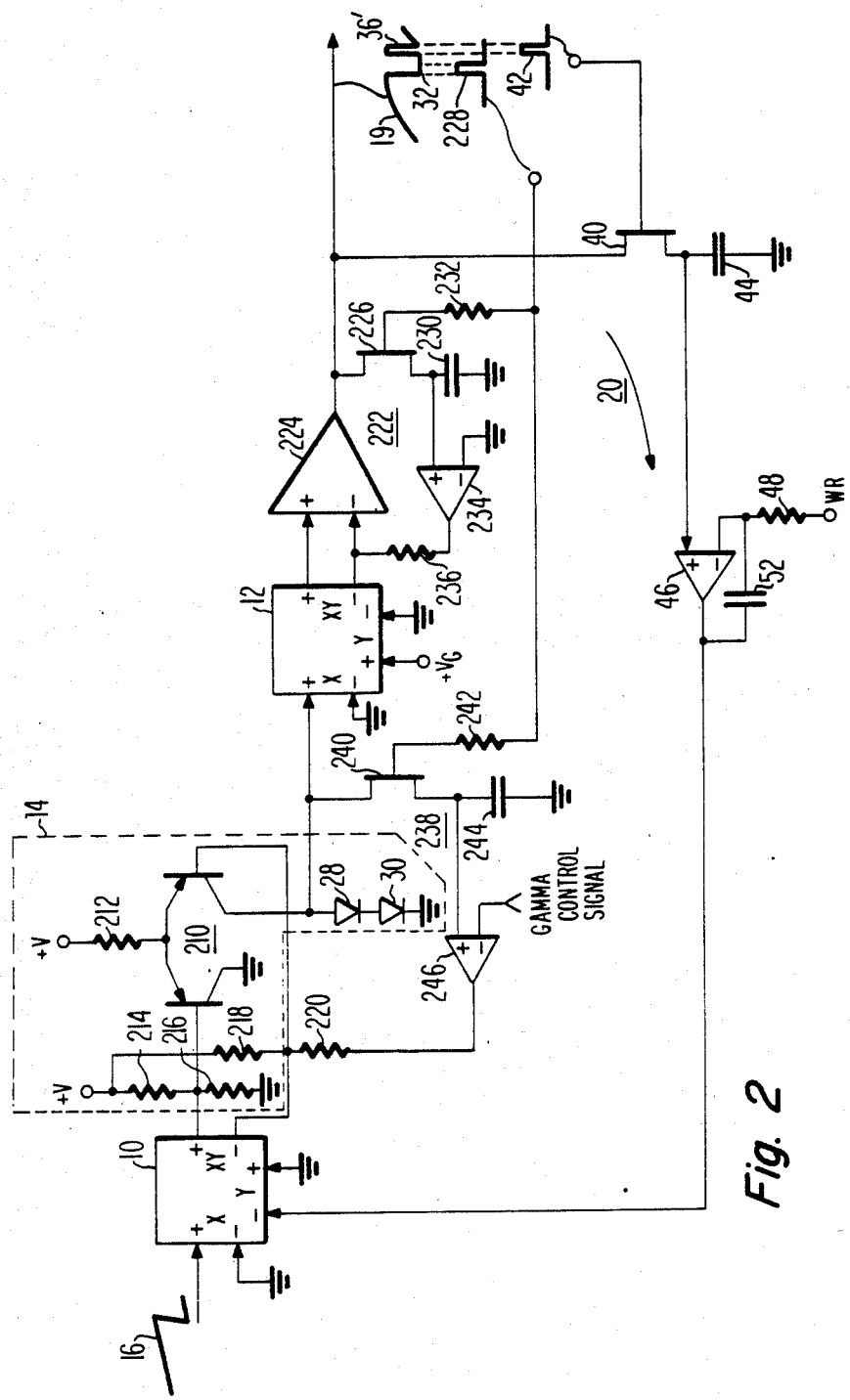
FIG. 2 illustrates, partially in block and partially in schematic diagram form, another embodiment of an adjustable gamma controller constructed in accordance with the present invention.

As earlier noted, black level clamps as shown in FIG. 2 are associated with amplifiers 10 and 12. It is desirable to provide a black level clamp in association with amplifier 10 to maintain the level of the video signal applied to nonlinear signal translating stage 14 within a preferred range of its nonlinear signal translating characteristic. It is desirable to provide a black level clamp in association with amplifier 12 to maintain a substantially constant black level for the video signal supplied to the signal processing circuits which follow the gamma corrector.

Thus, what has been described is a relatively simple and, therefore, cost effective and reliable gamma controller (due to reduced circuit components and reduced complexity) which is particularly well suited for remote control of gamma with a simply generated and transmitted DC voltage and which does not disturb the black or white levels of the video signal.

The embodiment of FIG. 1 can be modified within the principles of the present invention. For example, feedback loop 20 can be exclusively associated with amplifier 12 (i.e., the output of inverter 50 can be applied to gain control input 24 of amplifier 12) and the gamma control signal can be applied to gain control input 22 of amplifier 10. Alternatively, the gamma control signal could be used for controlling the level of the video signal applied to diodes 28 and 30 in other ways, e.g., by applying it to a black level clamp associated with amplifier 10, as will be next described with reference to FIG. 2, or by applying it to transistor 26 so as to shift its quiescent operating point. The gain of the amplifiers and the preferred embodiment for any particular situation will depend upon the desired range of gamma compensation and the amount of signal-to-noise degradation of the video signal which can be tolerated. As used throughout this description, the word "gain" is intended to also include a transmission characteristic of less than unity.

FIG. 2 illustrates an embodiment of the invention wherein the gamma control signal is applied to a video signal amplifier which precedes diodes 28 and 30. Elements of FIG. 2 having the same function as those described with respect to FIG. 1 are similarly numbered.

Gain controlled amplifiers 10 and 12 are illustrated as differential signal input and output XY multipliers of the MC1595 type, commercially available from Motorola Corporation. The video signal to be gamma corrected is applied to the noninverting X input of multiplier 10. The inverting X input of multiplier 10 is coupled to signal ground. A differential input amplifier 210, illustratively included in nonlinear signal translating stage 14, is responsive to the video signal provided at the differential output of multiplier 10 for linearly supplying the video signal representative current to series-coupled diodes 28 and 30. Resistors 212-220 bias amplifier 210 to a desired operating point within its linear signal translation range. The voltage signal developed across the p-n junctions of diodes 28 and 30 is applied between the noninverting and inverting X inputs, respectively, of multiplier 12. A fixed voltage $+V_g$ is applied between the noninverting and inverting Y inputs, respectively, of multiplier 12, causing it to provide a fixed amplification to the signal at its X input.

The structure and operation of feedback path 20 is substantially the same as previously described with respect to FIG. 1 except that the output of amplifier 46 is directly coupled to the inverting Y input of multiplier 10, obviating the need for inverter 50 of FIG. 1. The noninverting Y input of multiplier 10 is coupled to signal ground.

A black level clamp 222 associated with the output of multiplier 12 keeps the black level of gamma corrected video signal 19 at a predetermined level (e.g., signal ground) and includes a differential input amplifier 224 having its differential signal inputs coupled to corresponding signal outputs of multiplier 12. Black level clamp 222 also includes a switching FET 226 coupled to the output of amplifier 224 which is selectively rendered conductive in response to black gate pulses 228 for storing a signal level on a capacitor 230 which is representative of the level of the black portion of gamma corrected video signal 19 produced at the output of amplifier 224. Black gate pulses 228 are applied to the gate of FET 226 via a resistor 232 and are timed to occur within those portions of blanking intervals 32 which preceed respective white pulses 36'. A gain stabilized differential input amplifier 234 receives the stored black level at its noninverting input and has its inverting input coupled to the desired black level, e.g., signal ground. Amplifier 234 provides a current to the low input impedance of the inverting input of amplifier 224, which shifts the level of video signal 19 so that the black level of blanking portion 32 is at approximately zero volts (i.e. signal ground). The input impedance of amplifier 234 is high enough to allow capacitor 230 to hold its stored black level between successive black gate pulses 228.

In a similar manner, a black level clamp 238 is associated with the output of multiplier 10 and includes a switching FET 240 which is selectively rendered conductive by black gate pulses 228, applied to its gate electrode by a resistor 242, for storing the black level of the video signal developed at the output of nonlinear signal translating stage 14 on a capacitor 244. A gain stabilized differential signal input amplifier 246 receives the stored black level from capacitor 244 at its high input impedance noninverting input and a DC gamma control signal at its inverting input. Resistor 220 couples the output of the amplifier 246 to the junction between the inverting output of multiplier 10 and a signal input of amplifier 210. Therefore, by variation of the DC level of the gamma control signal, the black level of the video signal (and hence the signal range of the video signal itself) can be shifted up and/or down the nonlinear signal translation characteristic of series-coupled diodes 28 and 30, thus providing a relatively simple remotely controllable gamma correction. The proper video signal black level is restored by subsequent black level clamp 222.

Alternative embodiments of the type previously described with respect to FIG. 1 are also applicable to the FIG. 2 embodiment. Furthermore, since in FIG. 1 multiplier 12 is operated in the fixed gain mode, it could be replaced with a fixed gain amplifier having a differential signal output. These and other modifications are considered to be within the scope of the following claims.

What is claimed is:

1. An adjustable gamma controller for a video signal comprising:
   first and second serially-coupled amplifying means, each having respective signal inputs and outputs, said video signal being applied to said input of said first amplifying means;
   nonlinear signal translating means coupled between said signal output of said first amplifying means and said signal input of said second amplifying means for imparting a gamma characteristic to the video signal applied to its from said signal output of said first amplifying means;
   feedback means coupled to the signal output of said second amplifying means for sampling the video signal supplied from its output when said video signal is at a predetermined level for generating a gain-control signal which is applied to control the gain of said first amplifying means for maintaining said predetermined level of the video signal provided at the signal output of said second amplifier means at a given amplitude; and gamma control signal means for applying a gamma control signal to said second amplifying means for controlling its gain, variation of said gamma control signal changing the amount of gamma correction provided by said nonlinear signal translating means.

2. The apparatus of claim 1 wherein:
said predetermined level corresponds to the white level of said video signal.

3. The apparatus of claim 2 wherein:
said given amplitude corresponds to +1.4 volts.

4. The apparatus of claim 2 further including:
a signal combining means for adding a pulse having a level representative of the white level of said video signal to said video signal during a blanking interval thereof.

5. The apparatus of claim 4 wherein:
said blanking interval corresponds to a line blanking interval of said video signal.

6. The apparatus of claim 4 wherein:
said feedback means includes sample and hold means selectively rendered operative during the occurrence of said white pulse such that said feedback means generates said gain control signal for maintaining the white level of said video signal at said given amplitude.

7. The apparatus of claim 4 further including:
black level control means associated with each of said first and second amplifying means for maintaining the level of said blanking interval of said video signal at a predetermined black level.

8. A controllable video signal gamma corrector for a video signal comprising:
first and second serially coupled amplifying stages, each amplifying stage having respective signal inputs and outputs, said video signal being applied to said signal input of said first amplifying stage;

a signal translating stage having a nonlinear signal input/output characteristic coupled between said signal output of said first amplifying stage and said signal input of said second amplifying stages for imparting a gamma characteristic to the video signal applied to it from said signal output of said first amplifying stage;

a gain control feedback path coupled between the output of said second amplifying stage and a gain-control input of said first amplifying stage to control the gain of said first amplifying stage; and black level control means associated with each of said first and second amplifying stages for maintaining the level of blanking portions of said video signal at a predetermined black level; and a source of a gamma control signal for supplying a gamma control signal to the black level control means associated with said first amplifying stage to control the amount of gamma correction provided by said signal translating stage.

9. The apparatus of claim 8 further including:
signal combining means for adding a plulse having a level representative of the white level of said video signal to said video signal during a blanking interval thereof.

10. The apparatus of claim 9 wherein:
said blanking interval corresponds to a line blanking interval of said video signal.

11. The apparatus of claim 9 wherein:
said feedback path includes sample and hold means selectively rendered operable during the occurrence of said white pulse for generating a gain control signal which is applied to said gain-control input of said first amplifying stage for maintaining the white level of said video signal at a predetermined level.

12. An adjustable gamma controller for a video signal comprising:
signal combining means for adding a pulse having a level representative of the white level of said video signal to said video signal during a blanking interval thereof;

first and second serially-coupled amplifying means, each having respective signal inputs and outputs, said video signal including said pulse being applied to said input of said first amplifying means;

nonlinear signal translating means coupled between said signal output of said first amplifying means and said signal input of said second amplifying means for imparting a gamma characteristic to the video signal applied to it from the signal output of said first amplifying means;

feedback means coupled to the signal output of said second amplifying means for sampling the video signal supplied from its output during the occurrence of said pulse for generating a gain-control signal which is applied to control the gain of said first amplifying means for maintaining said predetermined level of the video signal provided at said signal output of said second amplifier means at a given amplitude;

black level control means associated with each of said first and second amplifying means for imparting respective blanking levels to said video signal during said blanking interval;

gamma control signal generating means for applying a gamma control signal to the black level clamp associated with said first amplifying means for controlling its blanking level, variation of said gamma control signal changing the amount of gamma correction provided by said nonlinear signal translating means.

13. An adjustable gamma controller for a video signal comprising:
first and second serially-coupled amplifying means, each having respective signal inputs and outputs, said video signal being applied to said input of said first amplifying means, said first and second amplifying means each comprising respective signal multiplying means;

nonlinear signal translating means coupled between said signal output of said first amplifying means and said signal input of said second amplifying means for imparting a gamma characteristic to the video signal applied to it from the signal output of said first amplifying means;

feedback means coupled to the signal output of said second amplifying means for sampling the video signal supplied from its output when said video signal is at a predetermined level for generating a gain-control signal which is applied to control the gain of said first amplifying means for maintaining said predetermined level of the video signal provided at the signal output of said second amplifier means at a given amplitude; and gamma control signal generating means for applying a gamma control signal to said second amplifying means for controlling its gain, variation of said gamma control signal changing the amount of gamma correction provided by said nonlinear signal translating means.

* * * * *